April 17, 1951 R. L. WALLACE, JR 2,549,550

VIBRATION-OPERATED TRANSISTOR

Filed Aug. 19, 1948

INVENTOR
ROBERT L. WALLACE, JR.
BY Harry C. Hart
ATTORNEY

Patented Apr. 17, 1951 2,549,550

UNITED STATES PATENT OFFICE 2,549,550

VIBRATION-OPERATED TRANSISTOR

Robert L. Wallace, Jr., Plainfield, N. J., assignor to Bell Telephone Laboratories, Incorporated, New York, N. Y., a corporation of New York Application August 19, 1948, Serial No. 45,024

14 Claims. (Cl. 179—100.41)

This invention relates to novel apparatus and methods for translating mechanical vibrations into electrical variations.

The principal object of the invention is to transform mechanical vibrations such as sound waves into electrical variations in a novel manner.

A related object is to obtain amplification of the transformed electrical variations simultaneously with the transformation.

Another object is to provide an electromechanical transducer which is extremely compact in size and light in weight.

Another object is to provide an electromechanical transducer having a high output power level and a high sensitivity.

The invention utilizes as its central element a three electrode semiconductor amplifier. This element comprises a small block of semiconductor material such as germanium having at least three electrodes electrically coupled thereto, which are termed the emitter electrode, the collector electrode and the base electrode. The emitter and the collector may be point contact electrodes making rectifier contact with the block, while the base electrode may be a plated metal film providing a low resistance contact. The emitter may be biased for conduction in the forward direction, while the collector is biased for conduction in the reverse direction. Application of a signal to the emitter electrode produces a signal-frequency current in the collector and in an external circuit connected thereto which may include a load. By reason of certain phenomena which take place within the block, amplified versions of the voltage, current, and power of the signal appear in the load. The device has come to be known as a transistor. It may take various forms, some of which are described in the following applications for patent:

| Application | Ser. No. | Filing Date |
|---|---|---|
| J. Bardeen-W. H. Brattain, subsequently abandoned in favor of— | 11,165 | Feb. 26, 1948 |
| J. Bardeen-W. H. Brattain, continuation in part of the above application (now Patent 2,524,035, issued October 3, 1950) | 33,466 | June 17, 1948 |
| J. Bardeen (now Patent 2,524,033, issued October 3, 1950.) | 11,166 | Feb. 26, 1948 |
| J. N. Shive | 44,241 | Aug. 14, 1948 |
| W. E. Kock-R. L. Wallace, Jr | 45,023 | Aug. 19, 1948 |

Various circuit applications adapting this device to particular uses are described in the following applications for patent:

| Application | Ser. No. | Filing Date |
|---|---|---|
| H. L. Barney-R. C. Mathes (now Patent 2,517,960, issued August 8, 1950.) | 22,854 | Apr. 23, 1948 |
| H. L. Barney (now Patent 2,486,776, issued November 1, 1949.) | 22,276 | Apr. 21, 1948 |
| A. J. Rack (now Patent 2,476,323, issued July 19, 1949.) | 27,890 | May 19, 1948 |

The present invention is based on the discovery that, in addition to their amplifying properties, transitors have microphonic properties as well, in that their electrical characteristics may be greatly affected by a small mechanical alteration of the contact between one of the electrodes, specifically the emitter, and the body of the semiconductor block. The mechanical alteration of the contact may comprise a change in the contact pressure or area or a change in the location of the contact as by sliding, rocking or rolling a suitably shaped electrode over the semiconductor surface, or it may comprise two or more such changes together. In either case the contact alteration may be derived from a microphone diaphragm, a phonograph needle or other vibration-responsive device, and may be imparted to the vibration-sensitive electrode by a suitable mechanical linkage. In operation, the microphonic properties of the device result in a transformation of the input vibrations into variations in the emitter current, the emitter contact resistance, the coupling between the emitter and the collector, or into two or more of these electrical features simultaneously; while, by reason of the amplifying properties of the device, the input vibrations, as thus electrically transformed, reappear in the output circuit at a higher power level.

The invention will be fully apprehended from the following detailed description of certain illustrative embodiments thereof, taken in conjunction with the appended drawings in which.

Figure 1:
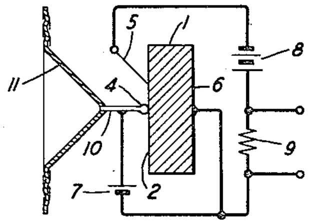
Fig. 1 is a schematic diagram of a microphone utilizing one form of semiconductor amplifier as an element.

Referring now to the figures, and by way of a first example to Fig. 1, the heart of the transducer of the invention is a three-electrode semiconductor amplifier unit which may be of the type which forms the subject-matter of the aforementioned applications of John Bardeen and W. H. Brattain. In brief and as a preferred example, it may comprise a small block 1 of germanium prepared in accordance with the teachings of an application of J. H. Scaff and H. C. Theuerer, Serial No. 638,351, filed December 29, 1945 and whose surface 2 has been etched as described in the Bardeen-Brattain applications. In addition to the etching treatment, improved results have sometimes been obtained by the further application of an anodic oxidation process as described for example in an application of R. B. Gibney, Serial No. 11,167, filed February 26, 1948. Two electrodes 4, 5 both of which are described in the Bardeen-Brattain applications as preferably being metal points, make contact with the treated surface 2 preferably close together. They may be denoted the emitter and the collector, respectively. A third electrode 6, denoted the base electrode, makes low resistance contact with the opposite face of the block 1. This may be a plated metal film. A small bias voltage source 7 of appropriate polarity is connected between the body of the semiconductor block 1 and the emitter electrode 4 while a larger bias voltage source 8 of opposite polarity is connected from the body of the block by way of a load resistance 9 to the collector electrode 5. The polarities of these sources 7, 8 are such that the emitter 4 is biased for conduction in the forward direction, while the collector 5 is biased for conduction in the reverse direction. The actual signs of the bias sources satisfying these conditions are dependent on the conductivity type (N-type or P-type) of the semiconductor material employed. In the case of N-type germanium, for example, the forward direction bias on the emitter electrode 4 is approximately one volt positive, while the reverse direction bias on the collector electrode 5 is approximately 50 volts negative.

In accordance with the present invention, the sharp emitter point of the Bardeen-Brattain application is replaced by a rounded one of substantially spherical shape, and of about 2–20 mils diameter. It is mounted on or formed as a part of one end of a light stiff rod 10 which is arranged to be driven by mechanical vibrations. Thus, for example, a microphone diaphragm 11, adapted to be driven by incident sound waves may have the form of a cone to whose apex one end of the rod 10 is fixed.

Figure 3:
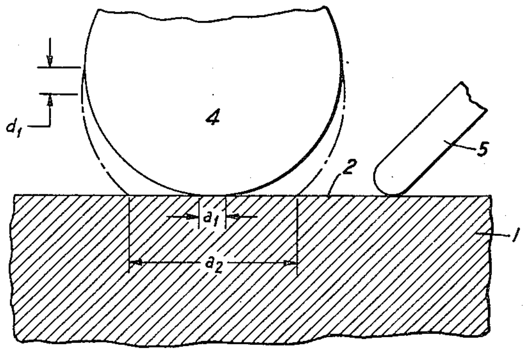
Fig. 3 is an enlarged cross-sectional view of Fig. 1 or Fig. 2.

As explained in the aforementioned Bardeen-Brattain application, the current in the circuit of the collector 5 and therefore in the load resistance 9 is sensitive to small variations in the voltage applied to the emitter electrode 4 and an amplified version of the emitter voltage and current appear in the output circuit and across the load 9. The present invention is based on the discovery that, in addition to such sensitivity of the device to changes in the emitter voltage, it is also highly sensitive to changes in the character of the emitter electrode contact. When mechanical vibrations such as sound waves gathered by the microphone diaphragm 11 and transmitted by way of the rod 10 to the spherical emitter electrode 4 alternately increase and diminish the pressure of this electrode on the surface 2, the area of contact is alternately increased and diminished in a much larger ratio and to a much greater extent than the movement of the link rod 10. This effect is illustrated in Fig. 3 wherein it is shown that, with a rigid upper surface 2 of the semiconductor block 1 and a hemispherical electrode 4 of an elastic or yielding material, a small axial displacement of the rod 10 of magnitude $d_1$ results in a change in the diameter of the area of contact from a value $a_1$ to a substantially greater value $a_2$. The actual area of contact, of course, changes in the ratio of the square of these dimensions. A further feature of the arrangement of Fig. 1 is that an increase in the pressure of the hemispherical electrode 4 of the semiconductor surface 2, in addition to producing an increase in the contact area, also brings a part of this contact area into closer proximity with the collector electrode 5. It has been found that the collector current in a device of the type described is highly sensitive to a change in the spacing between the emitter electrode and the collector electrode. The arrangement of Fig. 1 makes use of both of these effects. By increasing the contact area, a larger current is caused to flow from the emitter electrode 4 to the block 1 for a given emitter voltage; while bringing a part of this contact area closer to the collector electrode 5 also serves to produce an increase in the collector current due to an increase in the coupling between these two electrodes, and quite apart from the aforesaid increase in the emitter current.

Any minute irregularities in the surface of the block 1 may cause the variations in emitter contact area and emitter-to-collector spacing for a given movement of the link rod 10 to be jerky, with the result that the output of the device may be noisy. The block surface 2 should therefore be as smooth as possible, and is preferably polished, mechanically, electrolytically, or both. Processes for the electrolytic polishing of various surfaces are described in "Electrolytic Polishing of Stainless Steel and Other Metals" by Otto Zmeskal, published in "Metal Finishing" for July 1945 at page 280.

It has been found that a suitable material to serve as the emitter electrode is a small sphere of carbon, from 2 to 20 mils in diameter, fabricated by any of the processes which have become well known for the manufacture of carbon granule microphones. A granule of such carbon of suitable size may be brought to a spherical or hemispherical shape by mechanically working it in a jeweler's lathe. It is then preferably polished. Another suitable construction for the emitter electrode is a small sphere of a silicon compound having a tough skin of carbon coated thereon. The quartz sphere and its carbon coating or skin may be fabricated as described in United States Patent 1,973,703 to Goucher et al. and Patent 2,151,083 to Christensen et al. or otherwise as desired. The finished spherical electrode may be soldered to the end of the link rod 10, pressed into a depression preformed in the end of the rod, or otherwise mounted in any convenient fashion.

The principal requirements of the emitter electrode are that it shall be sufficiently elastic and yielding to withstand considerable unit pressures to which it is subjected in operation, be moderately conductive at least over its surface, and have no solid high resistance oxides. Both silicon compounds and carbon meet all of the mechanical requirements and carbon meets the electrical and the chemical requirements as well.

Figure 2:
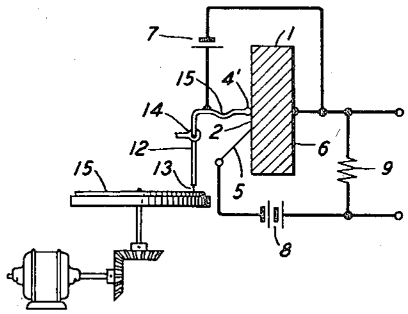
Fig. 2 is a schematic diagram of a phonograph reproducer or pickup utilizing the same form of semiconductor amplifier as an element.

Fig. 2 shows the adaptation of the apparatus of Fig. 1 to the reproduction of sound as recorded on a phonograph record of the laterally cut type. The semiconductor block 1 and its associated electrodes 4, 5, 6, and external circuits 7, 8, 9 may be the same as in Fig. 1. The spherical emitter electrode 4 is simultaneously pressed against the surface 2 of the semiconductor block 1 and rocked toward the collector electrode 5 by a mechanical link 12 to whose lower end a phonograph needle 13 is fixed. This link may be arranged to rock about a suitable point, schematically indicated by a pivot 14 which, in practice, will be mounted in the phonograph pickup arm in well-known manner. Lateral movement of the needle point 13 under the influence of the wave in the track on the phonograph record 15 produces a corresponding rotation of the spherical emitter electrode 4′ about the pivot point 14. This motion may be resolved into an axial component which varies the pressure and therefore the contact area under the emitter electrode 4′, and a lateral component which tends to make this electrode roll over the surface 2 of the block 1 thereby reducing its separation distance from the collector electrode 5. Inasmuch as all movements of the emitter electrode itself are extremely minute as compared with the lateral movement of a phonograph needle when following the sound track of a standard phonograph record, it may be desirable to include a spring 15 in the link 12 to avoid generating excessive forces at the emitter-to-semiconductor surface contact.

Various other electrode arrangements and mechanical drives therefor may be employed in connection with the semi-conductor amplifier of Figs. 1 and 2.

Figure 4:
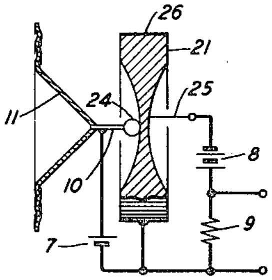
Fig. 4 is a schematic diagram of a microphone utilizing another form of semiconductor amplifier.
Figure 5:
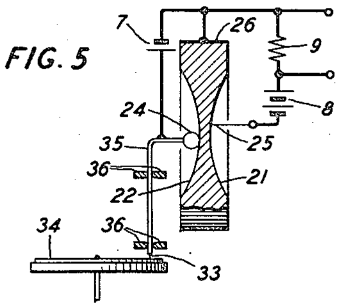
Fig. 5 is a schematic diagram of a phonograph reproducer utilizing this other form of semiconductor amplifier as an element.
Figure 6:
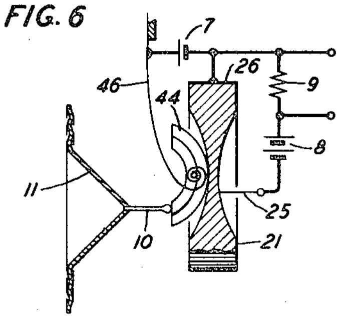
Fig. 6 is a schematic diagram of a microphone alternative to that of Fig. 4 but utilizing a modified electrode arrangement and based on a slightly modified principle of operation.

Some of these are illustrated in Figs. 4, 5, and 6 and discussed in connection therewith. Thus Fig. 4 shows a semiconductor amplifier of modified form in which the emitter electrode 24 and the collector electrode 25 are placed on opposite sides of a block 21 of semiconductor material at the thinnest part thereof, while a circumferential metal film or ring 26 serves as the base electrode. Such a construction forms the subject-matter of the aforementioned application of W. E. Kock and R. L. Wallace, Jr., and forms no part of the present invention, with the exception of the fact that for use as an electromechanical transducer, it is preferred to replace the sharp emitter point of the Kock-Wallace application by a spherical emitter electrode 24 and to place the latter in slight misalignment with the collector electrode 25 in its rest position. If the material of the block 21 be the same as that of the block 1 of Fig. 1, the bias sources and external circuits may likewise be the same. As in the case of Fig. 1, the emitter electrode 24 may be coupled to a microphone diaphragm in any suitable way, for example by fixing one end of a light, stiff rod 10 to the apex of a conical diaphragm 11 and mounting the spherical electrode 24 on the other end thereof. Actuation of the diaphragm 11 as by incident sound waves alternately increases and diminishes the force with which the electrode 24 bears on the surface of the semiconductor block 21 and therefore alters the contact area in the manner described in connection with Figs. 1 and 2. At the same time, if the emitter electrode 24 is in slight misalignment with the collector electrode 25 as illustrated in Fig. 4, this pressure variation also produces a variation in the length of the shortest current path from the emitter contact to the collector contact, and so in the coupling between these two electrtrodes.

Because the emitter and the collector are on opposite sides of the block 21, there is no possibility of mechanical interference between them, and the spherical electrode 24 may therefore be considerably larger than the electrodes 4 and 4′ of Figs. 1 and 2. For example, it may be about 10–100 mils in diameter.

Fig. 5 shows an arrangement in which the contact of the emitter electrode 24 is affected or modified by changing its location with respect to the collector electrode 25 without alteration of its pressure or area. For illustrative purposes the semiconductor amplifier shown is of the type described in the aforementioned Kock-Wallace application, and in connection with movement of the emitter contact by a phonograph needle 33 traveling in a groove of a vertically cut phonograph record 34. The principle of operation is that axial movements of the needle 33 are transmitted by way of a linkage rod 35, which is restrained against other movements by mechanical guides 36, and imparted to the emitter electrode 24 which therefore slides over the surface 22 of the semiconductor block 21 in conformity with the needle movements. The block and its associated circuits may otherwise be the same as in Fig. 4. The principle of operation of Fig. 5 may, of course, equally well be applied to movement of the emitter electrode 4 over the surface 2 of an unsymmetrical semiconductor amplifier such as that of Figs. 1 and 2 and to the actuation of this movement by a suitable linkage by the movements of a needle in a laterally cut phonograph record or from a voice-operated diaphragm or otherwise, as desired.

The pure sliding movements of the emitter electrode 24 over the surface of the block in Fig. 5 may be objectionable on account of unavoidable wear, both of the block surface 22 and of the emitter electrode 24. To reduce such wear it may be preferable to employ a rolling or rocking movement of the emitter electrode. To this end a construction such as that of Fig. 6 may be employed in which the emitter electrode has the form of a sector of a sharp-edged disc 44 whose diameter is slightly less than that of the concave surface of the semiconductor block, and which therefore makes contact with the surface at a point which moves as the block is rocked. The emitter electrode 44 may be held in a normal rest position in which its point of contact with the semiconductor material is in slight misalignment with the collector electrode 25 by a restoring spring 46 which may also serve as an electrical connection to the bias source 7. It may be caused to rock over the surface of the block 1 by a suitable light stiff mechanical linkage 10 from a sound-actuated diaphragm 11, a phonograph needle or any other vibration source.

As in the case of Fig. 5, pure rocking movements obtained by a structure such as that of Fig. 6 may be employed well in the case of the unsymmetrical semiconductor amplifier of Figs. 1 and 2.

The invention has been described on the supposition that, in the case of pressure variations, the emitter electrode itself is deformed while the surface of the semiconductor block 1 is not. Such deformations are microscopic at best and it is not known to what extent the material of the semiconductor is in fact itself deformed by action of the varying pressures of the emitter electrode. The invention is, of course, not to be construed as being limited to the deformation of any one member as compared with the other, or, indeed, to any of the particular forms shown and described above, which are illustrative only.

What is claimed is:

1. A transducer which comprises a body of semiconductive material, an input electrode having a tip formed of a sphere of elastic carbon making contact with a minute area of the surface of said body, two additional electrodes connected to said body, an input circuit connected to said input electrode and an output circuit connected to one of said additional electrodes, said body being adapted to translate electrical variations in the input circuit into amplified electrical variations in the output circuit, and mechanical signal-operated means for variably urging said carbon sphere against said body.

2. A transducer which comprises a semiconductive body, an arcuate electrode in contact with a surface thereof, said electrode having a curvature slightly greater than that of the surface, and vibration-operated means for rocking said electrode on the surface.

3. A transducer which comprises a semiconductive body, a first electrode making contact with a face of the body, a second electrode making contact with the same face and spaced from the first electrode, and vibration-operated means for altering said spacing.

4. An electromechanical transducer which comprises a block of semiconductive material, an emitter electrode, a collector electrode, and another electrode in contact with said block, said emitter electrode having a substantially spherical contact tip of carbon, and vibration-responsive means for varying the contact area of said carbon tip with said block.

5. An electromechanical transducer which comprises a block of semiconductive material, an emitter electrode, a collector electrode, and another electrode in contact with said block, and vibration-responsive means for varying the location on said block of one of said electrodes.

6. In combination, an electrical translating device comprising a semiconductive body, at least three electrodes operatively associated with said body of which a second is within the field of influence of the first, an input circuit including a forward bias source connected to the first one of said electrodes, an output circuit connected to the second one of said electrodes, said device being adapted to effect a translation of an electric signal applied to the input circuit into a replica thereof in the output circuit in dependence on the amount of said influence, and vibration-operated means for altering the location on said block of the first electrode relatively to the second electrode, thereby to modulate said influence in accordance with a mechanical signal.

7. An electromechanical transducer which comprises a disc of semiconductive material having a thin central portion, electrodes making rectifier contact with opposite faces of the thin portion of said disc, a third electrode making contact with the edge of the disc, and vibration-responsive means for affecting the contacts of one of said first-named electrodes.

8. Apparatus as defined in claim 7 wherein the vibration-affected electrode is spherical in form and of durably resilient material.

9. Apparatus as defined in claim 7 wherein the rest position of the vibration-affected electrode is misaligned with the oppositely located electrode.

10. An electromechanical transducer which comprises a disc of semiconductive material formed with depressions on opposite faces thereof, at least one of said depressions being substantially hemispherical and having a radius of curvature, an electrode in the form of a segment of a disc whose radius of curvature is slightly less than that of said hemispherical depression making contact with the base of said hemispherical depression, an electrode making contact with the base of the oppositely located depression, a third electrode making contact with the periphery of the semiconductive disc, and vibration-responsive means for causing said disc-shaped electrode to rock on the surface of said hemispherical depression.

11. A transducer which comprises a semiconductive body, an electrode having a carbon tip making contact by way of said tip with a face of said body, an electric circuit including a bias source interconnecting said electrode and said body, another electrode engaging said body, a circuit including a load connected to said other electrode and to said body, and vibration-operated means for variably urging said carbon tip against said face of said body, thereby to generate current variations in said load.

12. An electromechanical transducer which comprises a transistor having a block of semiconductive material, an emitter electrode, a collector electrode, and a base electrode in contact with said block, circuit means for biasing the collector electrode into its higher resistance condition and for biasing the emitter electrode into its lower resistance condition, and vibration-operated means for variably urging the emitter electrode against the block.

13. In an electromechanical transducer, a transistor comprising a body of semiconductor material, one portion of which is of one conductivity type and another portion of which is of different conductivity type, an emitter electrode engaging the first portion of the body, a collector electrode engaging the body to collect current flowing through the body by way of said emitter electrode and a base electrode providing a low resistance connection to said other portion of the body to vary the magnitude of said current, and vibration-operated means for variably urging the emitter electrode against the body.

14. Apparatus which comprises a transducer as defined in claim 13 and a load circuit interconnecting the collector electrode with the base electrode.

ROBERT L. WALLACE, JR.

REFERENCES CITED

The following references are of record in the file of this patent:

UNITED STATES PATENTS

| Number | Name | Date |
|---|---|---|
| 918,487 | Ellis | Apr. 13, 1904 |
| 1,691,358 | Phillippi | Nov. 13, 1928 |

(Other references on following page)

UNITED STATES PATENTS

| Number | Name | Date |
| --- | --- | --- |
| 1,754,175 | Lilienfeld | Jan. 28, 1930 |
| 1,759,967 | Thomas | May 27, 1930 |
| 1,871,253 | Bauer | Aug. 9, 1932 |
| 1,877,140 | Lilienfeld | Sept. 13, 1932 |
| 2,165,981 | Sampson | July 11, 1939 |
| 2,328,478 | Mason | Aug. 31, 1943 |
| 2,387,472 | Sontheimer | Oct. 23, 1945 |
| 2,402,515 | Wainer | June 18, 1946 |
| 2,402,661 | Ohl | June 25, 1946 |
| 2,418,516 | Lidow | Apr. 8, 1947 |
| 2,430,028 | Pfann | Nov. 4, 1947 |
| 2,472,770 | Helterline | June 7, 1949 |
| 2,486,776 | Barney | Nov. 1, 1949 |